Patented Feb. 20, 1951

2,542,395

UNITED STATES PATENT OFFICE 2,542,395

METHYLATION OF SUBSTITUTED URACIL

Frederick Comte, Kirkwood, Mo., assignor to Monsanto Chemical Company, St. Louis, Mo., a corporation of Delaware No Drawing. Application February 28, 1949, Serial No. 78,885

7 Claims. (Cl. 260—260)

This invention relates to certain 1,3-dimethyl derivatives of amino and formamido substituted uracil; more specifically this invention relates to an improved process for the production of 1,3-dimethyl-4-formamido-5-amino uracil or 1,3-dimethyl-4-amino-5-formamido uracil having the following respective formulas:

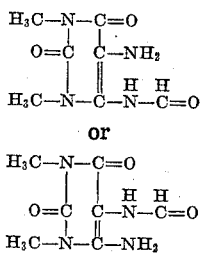

or

This material is an important intermediate for the preparation of various pharmaceuticals. The most convenient method of preparing 1,3-dimethl-4-formamido-5-amino uracil or 1,3-dimethyl-4-amino-5-formamido uracil would be by the methylation of 4-formamido-5-amino-uracil or 4-amino-5-formamido uracil having the following respective formulas:

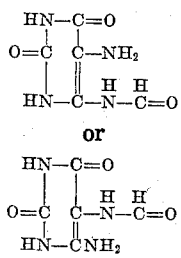

or

However, the reactivity of this material towards the common methylating agents has been found to be extraordinarily unique and unpredictable, so much so that a practical and economically satisfactory commercial process for their controlled methylation has not been heretofore realized. Thus methylation with methyl chloride has been found to require the use of exceedingly high pressures in order that a satisfactory yield of the desired 1,3-dimethyl derivative be produced. Such a process requires the use of costly pressure equipment which, in addition to being able to withstand the high pressures developed, must also be capable of resisting the highly corrosive action of the hydrochloric acid formed in the reaction. While methyl iodide as a methylating agent has been found to produce the desired product under ordinary pressures, yet similar corrosive conditions are created and the excessive cost of methyl iodide renders its use economically prohibitive. One of the most desirable methylating agents is dimethyl sulfate. Its low cost, availability, and ease of handling make it particularly attractive as a commercially feasible methylating agent. However, all attempts in the past to obtain 1,3-dimethyl-4-formamido-5-amino uracil or 1,3-dimethyl-4-amino-5-formamido uracil by the methylation of 4-formamido-5-amino uracil or 4-amino-5-formamido uracil with dimethyl sulfate have been unsuccessful.

It is an object of this invention to provide an improved process for the production of 1,3-dimethyl-4-formamido-5-amino uracil or 1,3-dimethyl-4-amino-5-formamido uracil.

It is a further object of this invention to provide a method for the production of 1,3-dimethyl-4-formamido-5-amino uracil or 1,3-dimethyl-4-amino-5-formamido uracil by the methylation of 4-formamido-5-amino uracil or 4-amino-5-formamido uracil with dimethyl sulfate.

Further objects will become apparent from the description of the novel process of this invention and the claims.

It has now been discovered that certain formamido-amino uracils, namely, 4-formamido-5-amino uracil or 4-amino-5-formamido uracil and its alkali metal salt may be conveniently and easily methylated with dimethyl sulfate to form 1,3-dimethyl-4-formamido-5-amino uracil or 1,3-dimethyl-4-amino-5-formamido uracil respectively when the methylation is carried out in a carefully controlled and limited pH range. Thus, it has been discovered that 1,3-dimethyl-4-formamido-5-amino uracil or 1,3-dimethyl-4-amino-5-formamido uracil is produced in high yields and exceptional purity when the correspondingly substituted formamadio-amino uracil or its alkyl metal salt is methylated in an aqueous medium by the simultaneous addition of an excess of dimethyl sulfate and an aqueous alkaline solution with constant agitation and at such a rate so as to maintain the reaction mixture at a pH in the range of from 7.0 to 11.0 and a temperature in the range of from 0° C. to 100° C.

In carrying out the novel process of this invention, the temperature may be maintained anywhere within the range of from 0° C. to 100° C. However for practical purposes, the preferred range is from about 20° C. to about 50° C.

It is of course desirable to have as high a concentration as possible of the formamido-amino uracil or its sodium salt in the aqueous suspension in order to obtain maximum yield per cycle. Inasmuch as the solubility limit of either of these materials may be exceeded so that the reaction medium is part suspension and part solution, the concentration utilized is governed chiefly by the viscosity of the resultant suspension which will permit efficient agitation. This in turn will be governed by the temperature of the reaction and the nature of the equipment and means of agitation. It has been found that concentrations in excess of about 25% by weight of the formamido-amino uracil generally produce suspensions which are too thick to agitate efficiently with ordinary equipment.

Either the formamido-amino uracil or its alkali metal salt may be utilized in this reaction. The alkali metal salt may be conveniently prepared by merely reacting one molecular proportion of the formamido-amino uracil with an approximately one molecular proportion of an alkali metal hydroxide in an aqueous medium.

In carrying out this methylation reaction, it is essential that the dimethyl sulfate and aqueous alkaline solution be added simultaneously and at such a rate so as to maintain the pH of the reaction mixture in the range of 7.0 to 11.0 and preferably in the range of 9.0 to 10.0. Lower pH conditions significantly decrease the rate of the reaction while higher pH conditions cause the formation of by-products. Obviously the rate of addition of the dimethyl sulfate and the aqueous alkaline solution need not and probably will not be identical. The expression "simultaneous addition" is used in its practical sense rather than its literal sense, meaning the addition of an alkaline solution to the reaction mixture during the methylation reaction which is taking place during the addition of the dimethyl sulfate in such a manner and rate to maintain the pH in the prescribed range. Thus, it is possible for the addition of the alkaline solution to be at times intermittent rather than continuous as long as the pH is maintained in the prescribed range.

The pH of the reaction mixture may be ascertained by any of the convenient methods well known to those skilled in the art with probably the most practical method being by means of continuous potentiometric measurements.

In order to particularly prescribe the nature of the aqueous alkaline solution utilized in this reaction, and the quantity of reactants, it is necessary to consider the theoretical aspects of the reactions that take place. When dimethyl sulfate, $(CH_3)_2SO_4$, is added to formamido-amino uracil, one methyl group of the dimethyl sulfate attaches to the uracil ring and methyl acid sulfate, $CH_3HSO_4$, remains. Thus to form the dimethyl substituted formamido-amino uracil there would theoretically be necessary the addition of two molecular proportions of dimethyl sulfate for each molecular proportion of formamido-amino uracil thereby forming two molecular proportions of methyl acid sulfate. This material is very highly acidic and must be neutralized by the addition of an alkaline solution to raise the pH into the aforescribed range in order that the reaction may proceed. However, the addition of an alkaline solution promotes the hydrolysis of dimethyl sulfate thereby decreasing the amount of dimethyl sulfate available for the methylation of the uracil ring. Consequently, an excess of dimethyl sulfate over the theoretical two molecular proportions must be utilized to obtain satisfactory yields. The amount of the excess of dimethyl sulfate is necessarily dependent to a great extent on the reaction conditions within the prescribed limits. It has been found that generally from about 20% to about 50% excess dimethyl sulfate over the theoretical two molecular proportions for each one molecular proportion of formamido-amino uracil is preferred.

Inasmuch as the methyl acid sulfate formed in the reaction is highly acidic, it is preferred that the alkaline solution also be strongly alkaline for practical purposes. Thus, aqueous solutions of sodium hydroxide, potassium hydroxide or ammonia are preferred, however other alkaline solutions such as a solution of sodium carbonate and the like may be used but are not too desirable. The concentration of such solutions may be varied over a wide range. The highest concentrations that still permit accurate pH control are preferred as less volume of solution is necessary. Aqueous alkaline solutions containing from about 20% to about 50% of the alkali metal hydroxides have been found to be quite advantageous because of their obvious economical advantages and ease of handling.

The 1,3-dimethyl-4-formamido-5-amino uracil or the 1,3-dimethyl-4-amino-5-formamido uracil formed in the reaction may be recovered by any of the methods well known to those skilled in the art. The most convenient method is that of merely cooling the reaction mixture and filtering the crystallized 1,3-dimethyl derivative, washing with water until free from sulfates, and then drying. The mother liquor from the reaction mixture may be further evaporated, preferably under reduced pressure, to obtain the small amount of the 1,3-dimethyl derivative retained.

The following examples are illustrative of the novel process of this invention:

*Example I*

34.0 g. of 4-formamido-5-amino uracil was added to 400 ml. of water having dissolved therein 19.7 g. of a 40.7% sodium hydroxide solution. The temperature of this mixture was adjusted to about 35° C. With constant agitation, 55 ml. of dimethyl sulfate was slowly added to the reaction mixture while simultaneously adding about 40 g. of a 40.7% sodium hydroxide solution at such a rate as to maintain a pH in the reaction mixture of from about 9.0 to about 10.0 as measured potentiometrically. After all of the reactants had been added, the reaction mixture was cooled to 25° C. and the crystals of 1,3-dimethyl-4-formamido-5-amino uracil filtered. The crystals were washed with water until free from sulfates. By evaporation of the mother liquor the remaining crystals of the 1,3-dimethyl-4-formamido-5-amino uracil were obtained. The crystals were then dried at about 110° C. thereby obtaining 29.4 g. of fine, white, needle crystals of 1,3-dimethyl-4-formamido-5-amino uracil having a decomposition point of about 264° C. The yield was about 75% based on 4-formamido-5-amino uracil.

*Example II*

51 g. of 4-formamido-5-amino uracil was slurried with constant agitation at a temperature of about 40° C. with about 500 ml. of $H_2O$. About 84 ml. of dimethyl sulfate and 83 g. of 41.1% sodium hydroxide were slowly added simultaneously to the reaction mixture, keeping the addition of the sodium hydroxide solution at such a rate as to maintain a pH in the range of from 8.5 to 10.5.

After all of the reactants had been added, the reaction mixture was cooled to about 0° C. and the white crystals of 1,3-dimethyl-4-formamido- 5-amino uracil recovered in the manner described in Example I. The yield was about 80% based on 4-formamido-5-amino uracil. The crystals decomposed at about 268°–270° C.

*Example III*

100 g. of 4-amino-5-formamido uracil was slurried with about 900 ml. of water. With constant agitation and while maintaining a temperature in the range of from 20° to 35° C. and a pH in the range of from 9.0 to 10.0, 170 ml. of dimethyl sulfate and about 176 g. of a 40% sodium hydroxide solution was slowly added to the reaction mixture.

After the reactants had been added an excellent yield of substantially pure crystals of 1,3-dimethyl-4-amino-5-formamido uracil was recovered from the reaction mixture in the manner described in Example I.

What is claimed is:

1. In the process for the production of certain 1,3-dimethyl substituted uracils the step comprising the addition with agitation of dimethyl sulfate to an aqueous medium containing a substituted uracil selected from the group consisting of 4-formamido-5-amino uracil, 4-amino-5-formamido uracil and their alkali metal salts in the ratio of at least two molecular proportions of the dimethyl sulfate per molecular proportion of the selected substituted uracil while simultaneously adding an aqueous alkaline solution so as to maintain the reaction mixture at a pH within the range of from 7.0 to 11.0 and a temperature in the range of 0° C. to 100° C.

2. In the process for the production of certain 1,3-dimethyl substituted uracils the step comprising the addition with agitation of dimethyl sulfate to an aqueous medium containing a substituted uracil selected from the group consisting of 4-formamido-5-amino uracil, 4-amino-5-formamido uracil and their alkali metal salts in the ratio of at least two molecular proportions of the dimethyl sulfate per molecular proportion of the selected substituted uracil while simultaneously adding an aqueous alkaline solution so as to maintain the reaction mixture at a pH within the range of from about 9.0 to 10.0 and a temperature in the range of from 20° C. to about 50° C.

3. The process as described in claim 2, wherein the substituted uracil is 4-formamido-5-amino uracil.

4. The process as described in claim 2, wherein the substituted uracil is 4-amino-5-formamido uracil.

5. The process as described in claim 2, wherein the substituted uracil is the alkali metal salt of 4-amido-5-amino uracil.

6. The process as described in claim 2, wherein the substituted uracil is the alkali metal salt of 4-amino-5-formamido uracil.

7. The process as described in claim 2 wherein the aqueous alkaline solution is an aqueous solution of an alkali metal hydroxide.

FREDERICK COMTE.

REFERENCES CITED

The following references are of record in the file of this patent:

Chemical Abstracts, 39, 697$^9$ (1945), [citing Rubstov, J. Gen. Chem. (USSR), 13, 710–716 (1943) (English Summary)].

Shepherd et al., J. Org. Chem., 12, 453 (1947).

Bobranski et al., J. Am. Pharm. Assoc., Science Edition, 37, 62–64 (Feb. 1948).

Certificate of Correction

Patent No. 2,542,395                                            February 20, 1951

FREDERICK COMTE

It is hereby certified that error appears in the printed specification of the above numbered patent requiring correction as follows:

Column 4, line 75, strike out "After all of the reactants had been added, the" and insert the same below "8.5 to 10.5." in line 72; column 6, line 10, after the word "from" insert *about*; line 20, strike out "amido" and insert instead *formamido*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*